United States Patent
Sankaranarayanan

(10) Patent No.: US 8,374,334 B2
(45) Date of Patent: Feb. 12, 2013

(54) SYSTEM AND METHOD FOR INTERACTIVE CUSTOMER SERVICE

(75) Inventor: Ramesh Sankaranarayanan, Irving, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 869 days.

(21) Appl. No.: 12/509,649

(22) Filed: Jul. 27, 2009

(65) Prior Publication Data

US 2011/0019812 A1 Jan. 27, 2011

(51) Int. Cl.
*H04M 3/00* (2006.01)
*H04W 24/00* (2009.01)
*G06Q 20/00* (2012.01)

(52) U.S. Cl. .............. 379/266.01; 370/311; 370/352; 370/389; 370/467; 379/88.16; 379/114.2; 379/142.09; 379/265.09; 455/425; 455/435.1; 704/260; 705/1.1; 705/28; 705/43; 705/79; 705/304; 706/50; 709/202; 725/112

(58) Field of Classification Search .............. 370/389, 370/467, 311, 352; 379/88.16, 114.2, 266.01, 379/142.09, 265.09; 704/260; 705/28, 42, 705/43, 79, 1.1, 26.1, 304; 706/50; 709/202; 725/112; 455/425, 435.1
See application file for complete search history.

(56) References Cited

U.S. PATENT DOCUMENTS

| | | | |
|---|---|---|---|
| 5,796,791 A * | 8/1998 | Polcyn | 379/265.09 |
| 5,901,209 A * | 5/1999 | Tannenbaum et al. | 379/142.09 |
| 6,192,050 B1 * | 2/2001 | Stovall | 370/389 |
| 6,681,232 B1 * | 1/2004 | Sistanizadeh et al. | 1/1 |
| 6,757,688 B1 * | 6/2004 | Leapaldt et al. | 1/1 |
| 6,829,250 B2 * | 12/2004 | Voit et al. | 370/467 |
| 7,092,509 B1 * | 8/2006 | Mears et al. | 379/266.01 |
| 7,213,046 B2 * | 5/2007 | Barillaud | 709/202 |
| 7,512,579 B2 * | 3/2009 | Sang et al. | 706/50 |
| 7,546,254 B2 * | 6/2009 | Bednarek | 705/26.1 |
| 7,596,373 B2 * | 9/2009 | McGregor et al. | 455/425 |
| 7,765,131 B2 * | 7/2010 | Klingenberg et al. | 705/28 |
| 7,778,937 B2 * | 8/2010 | Ferrara et al. | 705/304 |
| 7,814,016 B2 * | 10/2010 | Pranger | 705/42 |
| 7,855,977 B2 * | 12/2010 | Morrison et al. | 370/252 |
| 8,072,914 B2 * | 12/2011 | Brisebois et al. | 370/311 |
| 8,190,530 B2 * | 5/2012 | Redmond et al. | 705/79 |
| 2003/0212558 A1 * | 11/2003 | Matula | 704/260 |
| 2005/0273832 A1 * | 12/2005 | Zigmond et al. | 725/112 |
| 2006/0147005 A1 * | 7/2006 | Taub | 379/114.2 |
| 2009/0281817 A1 * | 11/2009 | Ferrara et al. | 705/1 |
| 2010/0081434 A1 * | 4/2010 | Ahluwalia | 455/435.1 |
| 2011/0019812 A1 * | 1/2011 | Sankaranarayanan | 379/266.01 |
| 2012/0185388 A1 * | 7/2012 | Pranger | 705/43 |

* cited by examiner

Primary Examiner — Gerald Gauthier

(57) ABSTRACT

A method is implemented by one or more server devices associated with a network. The method includes receiving information relating to a customer service request, where the information includes data to identify a category of the customer service request. The method also includes receiving a request to speak with a customer service agent, and placing a service call request in a calling queue associated with the category of the customer service request. The method further includes monitoring availability of customer service agents associated with the calling queue, and sending a call initiation message to the access terminal when a customer service agent associated with the calling queue is available. Based on the call initiation message, the access terminal may automatically initiate a voice session with an available customer service agent.

22 Claims, 9 Drawing Sheets

SYSTEM AND METHOD FOR INTERACTIVE CUSTOMER SERVICE

BACKGROUND INFORMATION

Telephone-based customer support services frequently require a user to progress through decision trees using interactive voice recognition (IVR) or other automated systems. Customers may experience frustration with unsuccessful IVR interactions or encounter long wait times during peak call periods. Computer-based customer support services may provide (e.g., via a network) a broader range of automated information and with reduced wait times. However, if the computer-based system fails to provide adequate information, a customer may still need to speak with a customer service agent.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide an interactive customer service interface that can be accessed via an access terminal (e.g., a radiotelephone, a personal communications system (PCS) terminal, a personal digital assistant (PDA), a smart phone, etc.). A user in need of customer service may activate the interactive customer service interface to navigate through a series of options (e.g., a decision tree) to identify and address the user's inquiry/request. The interactive customer service interface may prompt the user with possible solutions. In some implementations, the interactive customer service interface may initiate a data session with a data server to exchange information between the access terminal and the data server to provide a response to the user inquiry.

If, after navigating through all or part of the decision tree, the user determines that a conversation with a customer service agent (i.e., a person) is desired, the interactive customer service interface may request the data server to register an identifier for the user in a call queue along with information about the user and/or the user's request. When a customer service agent responsible for the user's particular type of request becomes available, the interactive customer service interface of the access terminal may be notified and may automatically place a call to the available customer service agent. In some implementations, data collected by the data server may be accessed by the customer service agent when the access terminal places the call.

As used herein, the terms "user" and/or "customer" may be used interchangeably. Also, the terms "user" and/or "customer" are intended to be broadly interpreted to include an access terminal or a user of an access terminal. As used herein, the term "interactive customer service interface" is intended to be broadly interpreted to refer to an access terminal or an application residing on an access terminal.

Figure 1:
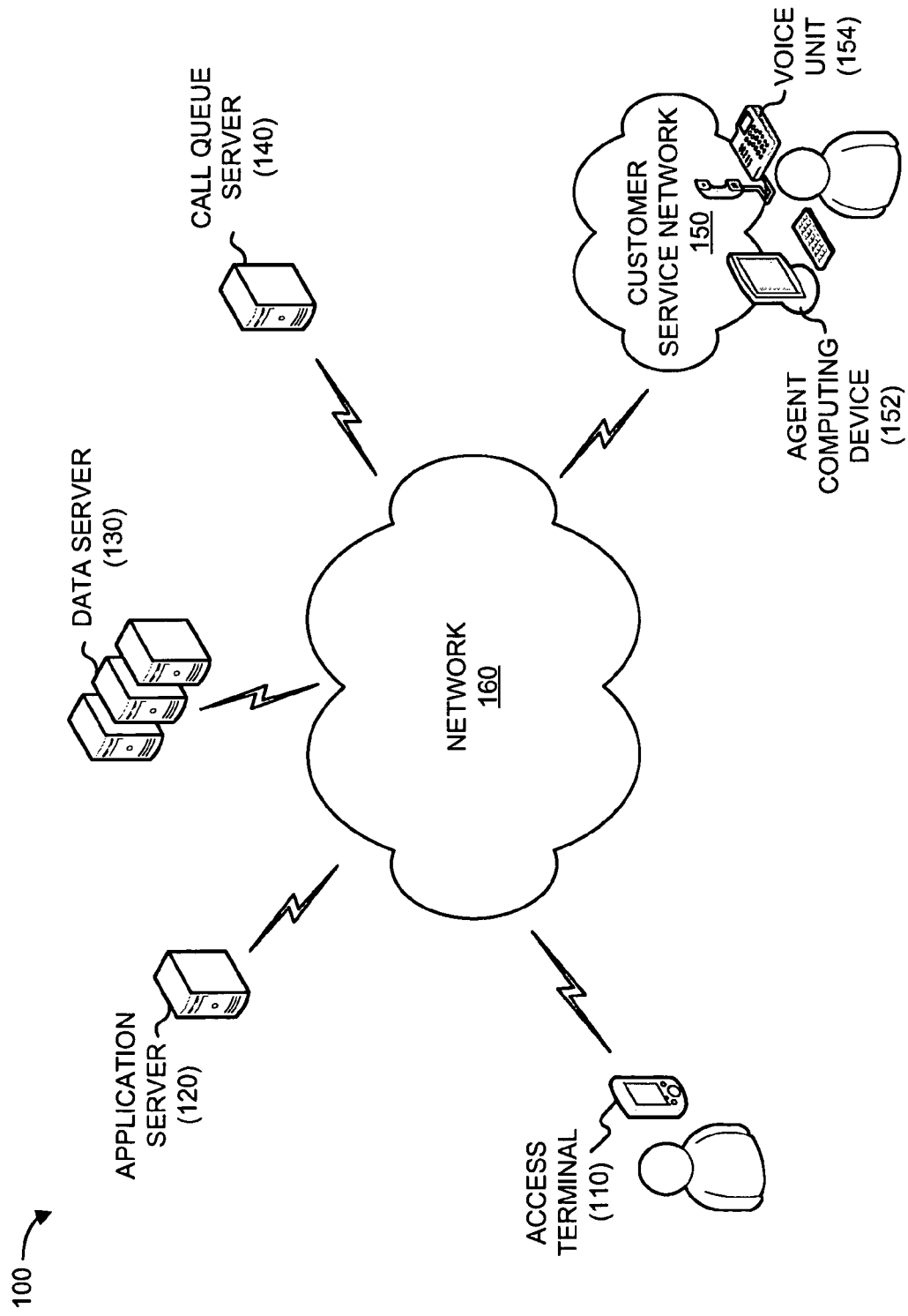
FIG. 1 depicts an exemplary network in which systems and/or methods described herein may be implemented.

FIG. 1 depicts an exemplary network 100 in which concepts described herein may be implemented. As illustrated, network 100 may include an access terminal 110, an application server 120, a data server 130, a call queue server 140, and a customer service network 150 interconnected by a network 160. Customer service network 150 may include one or more agent computing devices 152 and one or more voice units 154. Components of network 100 may interconnect via wired and/or wireless connections. A single access terminal 110, application server 120, data server 130, call queue server 140, customer service network 150, and network 160 have been illustrated in FIG. 1 for simplicity. In practice, there may be more access terminals 110, application servers 120, data servers 130, call queue servers 140, customer service networks 150, and networks 160.

Access terminal 110 may include a device capable of transmitting and receiving data (e.g., voice, text, images, and/or multimedia data) over a wireless network. For example, access terminal 110 may include a handheld device, such as a cellular telephone, a PDA, etc.; a conventional laptop and/or palmtop receiver; and/or or another appliance that includes a radiotelephone transceiver with Mobile Internet Protocol (Mobile IP) capabilities. In one implementation, access terminal 110 may communicate via packet-based or non-packet-based wireless transmissions. In implementations herein, access terminal 110 may include an interactive customer service interface to facilitate customer service inquiries from a user. Access terminal 110 may automatically initiate a data connection with, for example, data server 130 and/or a voice connection with, for example, agent computing device 152 upon a user initiating the interactive customer service interface.

Application server 120 may include one or more server entities, or other types of computation or communication devices, that gather, process, search, and/or provide information in a manner described herein. Application server 120 may provide information relating to an interactive customer service interface to access terminal 110 via network 160. In one implementation, application server 120 may provide, to access terminal 110, instructions (e.g., a software download) for an interactive customer service interface. In another implementation, application server 120 may provide access terminal 110 with updates to the interactive customer service interface. Communications between application server 120 and access terminal 110 are described further, for example, in connection with FIG. 4.

Data server 130 may include one or more server entities, or other types of computation or communication devices, that gather, process, search, and/or provide information in a manner described herein. In one implementation, data server 130 may be associated with an entity that owns and/or manages service providers for which a user (e.g., a user of access terminal 110) has an inquiry. In one implementation, data server 130 may establish a data connection with access terminal 110, and may receive from access terminal 110 information associated with a user inquiry. Data server 130 may also provide information to access terminal 110 in response to inquiries from access terminal 110 (e.g., inquiries initiated via the interactive customer service interface). Data server 130 may also inform call queue server 140 of a service call request when a user of access terminal 110 desires to speak with a customer service representative.

Call queue server 140 may include one or more server entities, or other types of computation or communication devices, that gather, process, search, and/or provide information in a manner described herein. In one implementation, call queue server 140 may manage customer requests to speak with customer service agents in particular specialties (e.g., areas of interest to a customer, such as billing, technical services, new customers, etc.). Call queue server 140 may receive a service call request from data server 130 and place the service call request in an appropriate queue based on information provided in the service call request. In an exemplary implementation, call queue server 140 may provide queue status information to customer service network 150 and receive agent availability information from customer service network 150 to process/update each queue. Call queue server 140 may provide an initiate call message to an access terminal when a customer service agent is available to handle a particular service call request associated with the access terminal.

Customer service network 150 may facilitate interaction of customer service agents with customers. For example customer service network 150 may include groups of agents that provide multiple categories of customer service. Customer service network 150 may include one or more networks including a wireless network, a satellite network, the Internet, a telephone network, such as the Public Switched Telephone Network (PSTN), a metropolitan area network (MAN), a wide area network (WAN), a local area network (LAN), a mesh network, or another type of network. In an exemplary implementation, customer service network 150 may include a combination of networks and other components (e.g., switches, routers, etc.) for transmitting data to and from agent computing device 152.

Customer service network 150 may also include one or more voice units 154 (e.g., conventional telephones, voice over IP (VoIP) systems, cellular telephones, etc.) to provide voice connectivity between a customer service agent (e.g., person) of customer service network 150 and a user of access terminal 110. Voice unit 154 may or may not be connected with customer service network 150. Customer service network 150 (including agent computing device 152 and voice unit 154) may be used by a customer service provider to respond to customer service inquires from a user of access terminal 110. In one implementation, customer service network 150 may communicate with data server 130 and/or call queue server 140 to retrieve and/or provide information associated with access terminal 110 to facilitate a service call.

Network 160 may include one or more networks including a wireless network, a satellite network, the Internet, a telephone network, such as the PSTN, a MAN, a WAN, a LAN, a mesh network, or another type of network. Network 160 may include a data network or a data and voice network to facilitate both data and voice exchanges between access terminal 110 and one or more of application server 120, data server 130, call queue server 140, and customer service network 150. Network 160 may send and/or receive information via packet-based or non-packet-based exchanges. In one implementation, network 160 may be operated by an entity that provides wireless communication services to a customer, such as a user of access terminal 110, as a managed service (e.g., for a monthly fee). Network 160 may send and/or receive encrypted information and/or unencrypted information.

In operation, processes in network 100 may be initiated by a user of access terminal 110 activating the interactive customer service interface. A user may navigate through various screens of the interactive customer service interface to identify a request/inquiry. When information beyond the scope of the interactive customer service interface is needed, access terminal 110 may establish a data session with data server 130 to exchange information to facilitate the customer request. If it is determined that the customer request requires interaction with a customer service agent, data server 130 may provide a service call request to call queue server 140 to track the availability of an appropriate customer service agent. When an agent is available, call queue server 140 may send a message to access terminal 110 to have access terminal 110 automatically initiate a call to the available customer service agent at customer service network 150.

Although FIG. 1 shows exemplary components of network 100, in other implementations, network 100 may contain fewer, different, differently arranged, or additional, components than depicted in FIG. 1. For example, in one implementation, one or more of application server 120, data server 130, and call queue server 140 may be combined. In still other implementations, one or more components of network 100 may perform one or more other tasks described as being performed by one or more other components of network 100.

Figure 2:
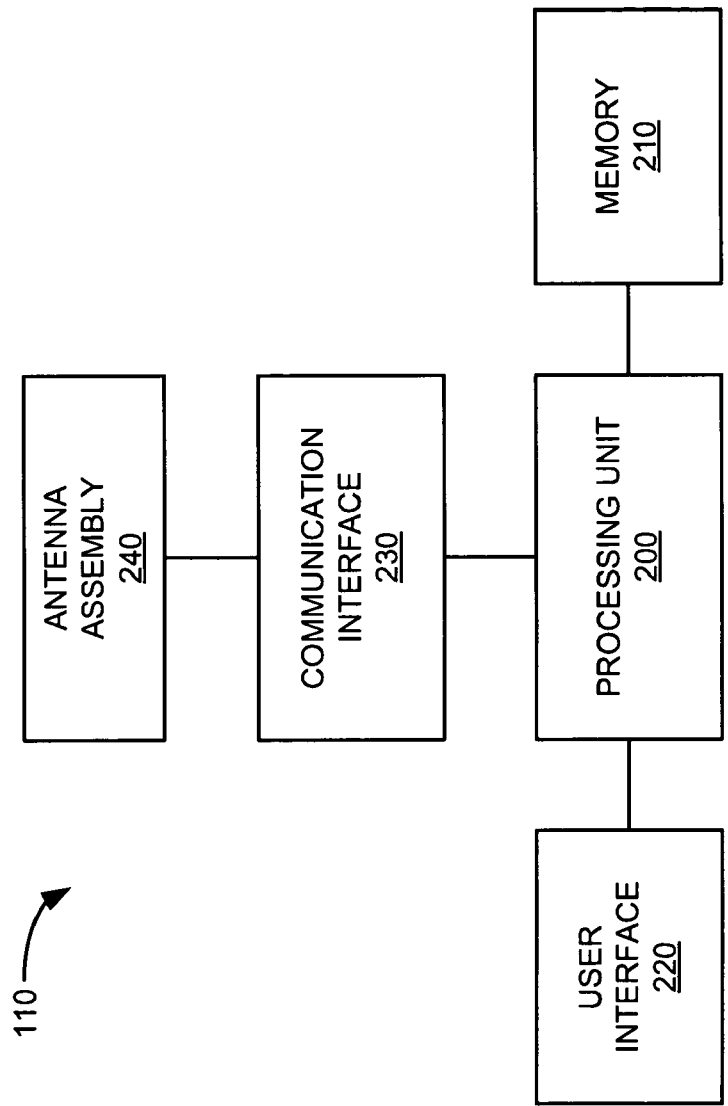
FIG. 2 provides a diagram of exemplary components of an access terminal of FIG. 1.

FIG. 2 is a diagram of exemplary components of access terminal 110. As illustrated, access terminal 110 may include a processing unit 200, memory 210, a user interface 220, a communication interface 230, and/or an antenna assembly 240.

Processing unit 200 may include one or more processors, microprocessors, application specific integrated circuits (ASICs), field programmable gate arrays (FPGAs), or the like. Processing unit 200 may control operation of access terminal 110 and its components. In one implementation, processing unit 200 may control operation of components of access terminal 110 in a manner described herein.

Memory 210 may include a random access memory (RAM), a read-only memory (ROM), and/or another type of memory to store data and instructions that may be used by processing unit 200.

User interface 220 may include mechanisms for inputting information to access terminal 110 and/or for outputting information from access terminal 110. Examples of input and output mechanisms might include buttons (e.g., control buttons, keys of a keypad, a joystick, etc.) or a touch screen interface to permit data and control commands to be input into access terminal 110; a speaker to receive electrical signals and output audio signals; a microphone to receive audio signals and output electrical signals; and/or a display to output visual information (e.g., text input into access terminal 110).

Communication interface 230 may include, for example, a transmitter that may convert baseband signals from processing unit 200 to radio frequency (RF) signals and/or a receiver that may convert RF signals to baseband signals. Alternatively, communication interface 230 may include a transceiver to perform functions of both a transmitter and a receiver. Communication interface 230 may connect to antenna assembly 240 for transmission and/or reception of the RF signals.

Antenna assembly 240 may include one or more antennas to transmit and/or receive RF signals over the air. Antenna assembly 240 may, for example, receive RF signals from communication interface 230 and transmit them over the air, and receive RF signals over the air and provide them to communication interface 230. In one implementation, for example, communication interface 230 may communicate with a network and/or devices connected to a network (e.g., network 160).

As will be described in detail below, access terminal 110 may perform certain operations in response to processing unit 200 executing software instructions of an application contained in a computer-readable medium, such as memory 210. A computer-readable medium may be defined as a physical or logical memory device. A logical memory device may include memory space within a single physical memory device or spread across multiple physical memory devices. The software instructions may be read into memory 210 from another computer-readable medium or from another device via communication interface 230. The software instructions contained in memory 210 may cause processing unit 200 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of access terminal 110, in other implementations, access terminal 110 may contain fewer, different, differently arranged, or additional components than depicted in FIG. 2. In still other implementations, one or more components of access terminal 110 may perform one or more other tasks described as being performed by one or more other components of access terminal 110.

Figure 3:
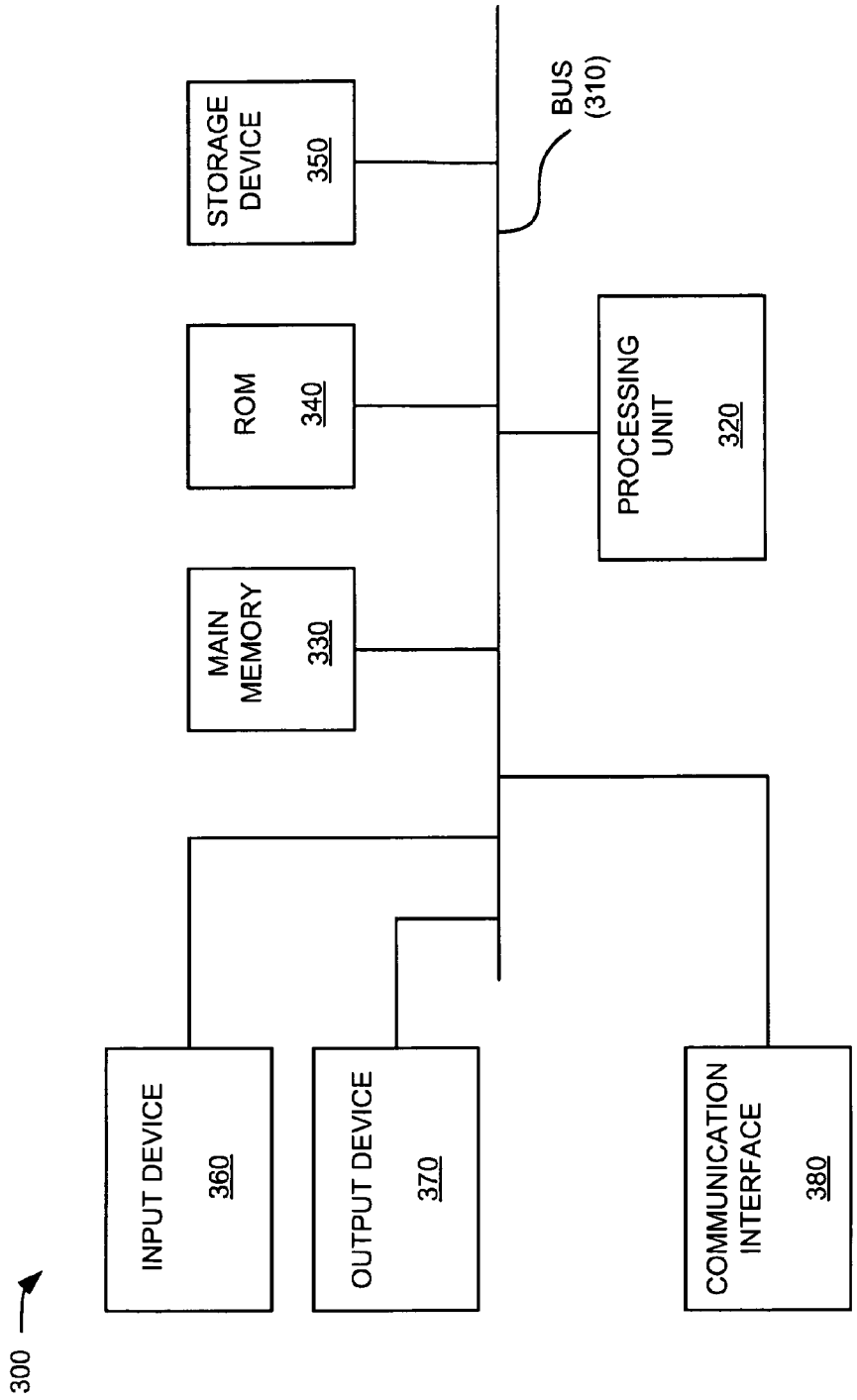
FIG. 3 is an exemplary diagram of a device that may correspond to any of the access terminal, an application server, a data server, a call queue server, and/or an operator computing device of FIG. 1.

FIG. 3 depicts a diagram of exemplary components of a device 300 that may correspond to access terminal 110 (e.g., if access terminal 110 is a laptop computer), application server 120, data server 130, call queue server 140, and/or agent computing device 152. As illustrated, device 300 may include a bus 310, a processing unit 320, a main memory 330, a ROM 340, a storage device 350, an input device 360, an output device 370, and/or a communication interface 380. Bus 310 may include a path that permits communication among the components of device 300.

Processing unit 320 may include one or more processors, microprocessors, or other types of processors that may interpret and execute instructions. Main memory 330 may include a RAM or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive.

Input device 360 may include a mechanism that permits an operator to input information to device 300, such as a keyboard, a mouse, a pen, a microphone, voice recognition and/or biometric mechanisms, a touch screen, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network, such as customer service network 150 or network 160.

As described herein, device 300 may perform certain operations in response to processing unit 320 executing software instructions contained in a computer-readable medium, such as main memory 330. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, differently arranged, or additional components than depicted in FIG. 3. In still other implementations, one or more components of device 300 may perform one or more other tasks described as being performed by one or more other components of device 300.

Figure 4:
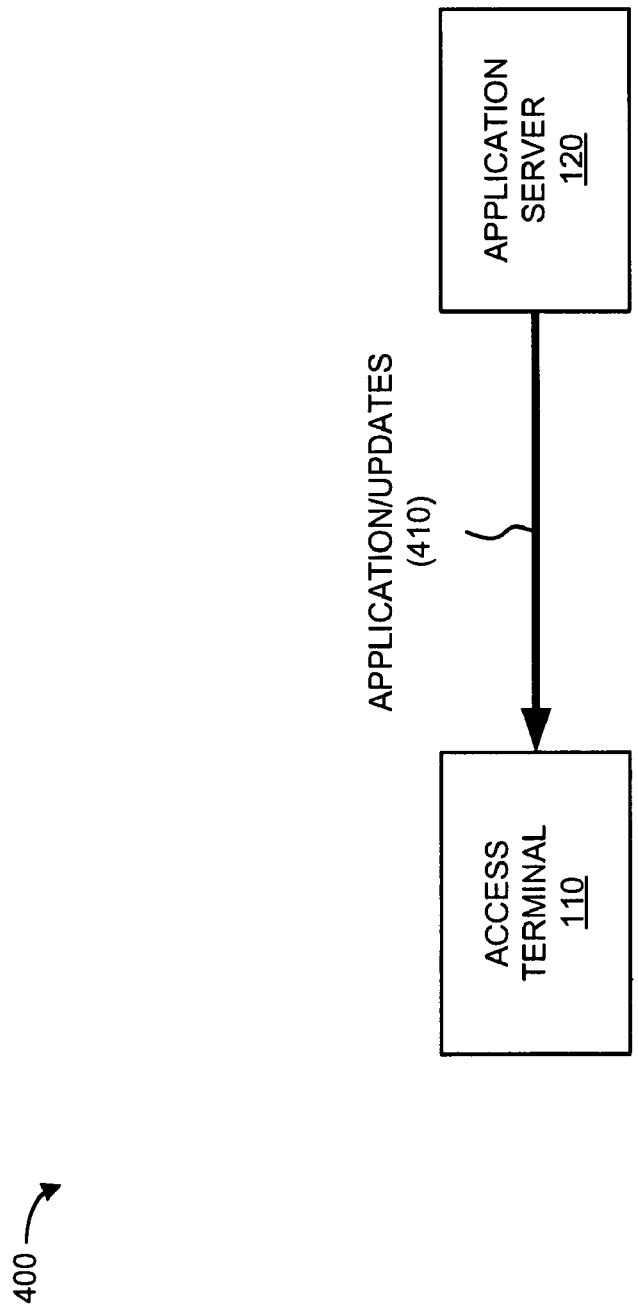
FIG. 4 illustrates exemplary interactions among components of an exemplary portion of the network depicted in FIG. 1.

FIG. 4 illustrates exemplary interactions among components of an exemplary portion 400 of network 100. As illustrated, exemplary network portion 400 may include access terminal 110 and application server 120. Access terminal 110 and application server 120 may include the features described above in connection with, for example, FIG. 1.

As shown in FIG. 4, application server 120 may provide an application and/or application updates for the interactive customer service interface, as shown by reference number 410. The application for the interactive customer service interface may include menu information, a tree/directory structure, connection information for data server 130, and other information to facilitate customer inquiries. In another implementation, the application for the interactive customer service interface may be provided with access terminal 110 as original equipment manufacturer (OEM) equipment. Thus, only updates would be provided to access terminal 110 by application server 120. In one implementation, application/updates 410 may be provided, for example, over an established TCP/IP (Transmission Control Protocol/Internet Protocol) connection.

In an exemplary implementation, the application for the interactive customer service interface may cause access terminal 110 to ping application server 120 for updates at regular intervals (e.g., once a day). In other implementations, application server 120 may initiate the provision of updates to access terminal 110 as they become available. For example, if application server 120 has data to send to access terminal 110 and no TCP/IP connection exists, or data transfer over an existing TCP/IP connection is unsuccessful, application server 120 may utilize an identifier to send an indication to access terminal 110. The identifier may include information to permit communication from application server 120 to access terminal 110 outside of a TCP/IP connection. For example, the indication may be sent over an alternate channel that does not restrict server initiated messages/traffic. Examples of alternate channels may include: a Short Message Service (SMS) message, a User Datagram Protocol (UDP) push, or application server 120 sending an indication to an intermediate entity (e.g., an evolution-data optimized (EVDO) session manager or an access network base station controller (AN/BSC)) which in turns sends the indication to access terminal 110 using a unicast access terminal identifier (UATI) assigned to access terminal 110.

Although FIG. 4 shows exemplary components of network portion 400, in other implementations, network portion 400 may contain fewer, different, differently arranged, or additional components than depicted in FIG. 4. In still other implementations, one or more components of network portion 400 may perform one or more other tasks described as being performed by one or more other components of network portion 400.

Figure 5:
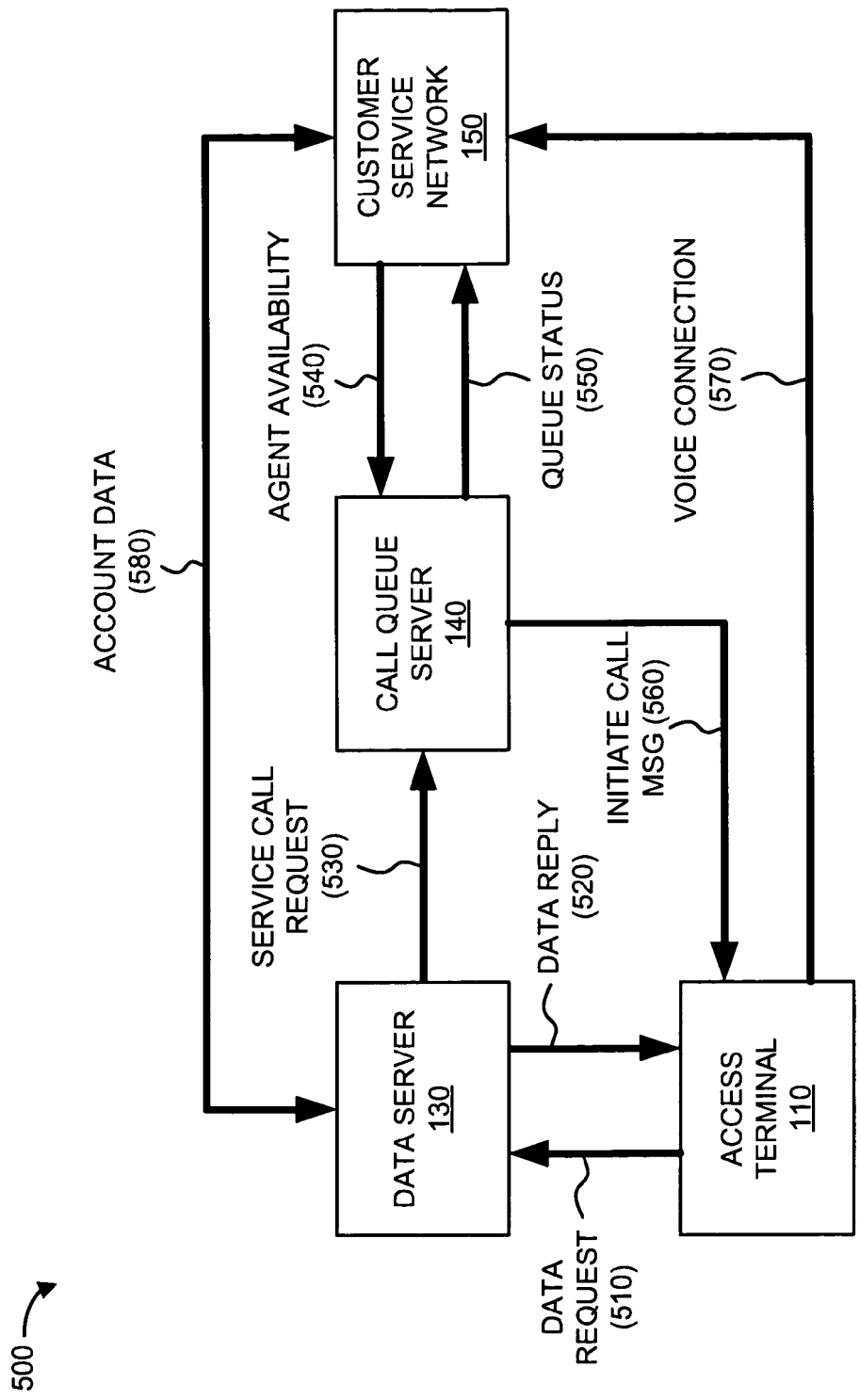
FIG. 5 illustrates exemplary interactions among components of another exemplary portion of the network depicted in FIG. 1.

FIG. 5 illustrates exemplary interactions among components of another exemplary portion 500 of network 100. As illustrated, exemplary network portion 500 may include access terminal 110, data server 130, call queue server 140, and customer service network 150. Access terminal 110, data server 130, call queue server 140, and customer service network 150 may include the features described above in connection with, for example, FIG. 1.

As shown in FIG. 5, when a user of access terminal is using the interactive customer service interface, access terminal 110 may initiate a data request to data server 130, as indicated by reference number 510. In one implementation, data request 510 may be initiated automatically by the interactive customer service interface of access terminal 110. For example, a user navigating through the interactive customer service interface may provide an inquiry that requires information from an external source. Access terminal 110 may provide data request 510 to data server 130 to obtain the requested information. In one implementation, access terminal 110 may establish a secure IP connection with data server 130. As part of data request 510, access terminal 110 may also supply stored information relating to the access terminal, such as a device model, a device class, a mobile directory number (MDN), a UATI, an IP address/UDP port, user account information and other technical information associated with access terminal 110. In one implementation, access terminal 110 may require user authorization (e.g., a password, a personal identification number (PIN), or other security measure) before the information may be provided to data server 130.

Data server 130 may review data request 510 and determine if data server 130 has information, or can obtain information from another source, that is sufficient to respond to data request 510. If so, a data reply 520 with responsive information may be sent from data server 130 to access terminal 110. Data reply 520 may include a response to data request 510. Data reply 520 may include, for example, information relating to technical support issues, account/billing information, personal settings, requests for additional information (e.g., requests outside the scope of the interactive customer service interface of access terminal 110), etc. If data server 130 does not have, or cannot obtain, information that is sufficient to respond to data request 510, data reply 520 with a negative response and/or a suggestion to speak to a customer representative may be provided.

Multiple data requests 510 and multiple data replies 520 may be exchanged between access terminal 110 and data server 130. In some implementations, data request 510 may include a request to speak with a customer service representative (e.g., either through a menu option or in response to a suggestion from data server 130). When data request 510 includes a request to speak to a customer service representative, data server 130 may initiate a service call request to call queue server 140, as indicated by reference number 530. Service call request 530 may include particular information from data request 510/data reply 520 sufficient to identify a particular type of customer service agent to address the request from the user of access terminal 110. For example, service call request 530 may include information regarding where a user has progressed in a directory tree of the interactive customer service interface, what information has been requested by the user, what type product/service is applicable, etc. Based on information from service call request 530, call queue server 140 may assign the user to a queue associated with the nature of the user's request. For example, if the user's request (as identified by the interactive customer service interface) concerns a technical inquiry regarding an Internet provider service, call queue server 140 may place the user in a queue for customer service agents handling Internet technical support.

Customer service network 150 may provide updates to call queue server 140 regarding the availability of customer service agents within customer service network 150, as indicated by reference number 540. For example, customer service network 150 may provide real-time updates of customer service agents, including whether a particular agent is available or unavailable to receive incoming calls. Agent availability 540 may also indicate what call/customer, if any, an agent is currently assisting. Call queue server 140 may use agent availability 540 information to track the one or more call queues and to identify available agents.

Call queue server 140 may provide the status of one or more call queues to customer service network 150, as indicated by reference number 550. For example, call queue server 140 may provide a queue listing for each category of customer service agents available within customer service network 150. Queue status 550 may be used within customer service network 150, for example, to manage customer service agent staffing and resources. In one implementation, queue status 550 may also provide user information or a link to user information relevant to the user's request.

Initiate call message 560 may be provided from call queue server 140 to access terminal 110 when an appropriate customer service agent is available at customer service network 150. For example, if the user's request (as identified by the interactive customer service interface) concerns a technical inquiry regarding an Internet provider service, call queue server 140 may send initiate call message 560 to access terminal 110 when a customer service agent handling Internet technical support is available. Initiate call message 560 may include instructions for the interactive customer service interface residing on access terminal 110 to initiate a call to the designate customer service agent. Initiate call message 560 may include, for example, a direct dial number (e.g., a telephone number) or other access information to allow the interactive customer service interface of access terminal 110 to automatically place a call to the available customer service agent. In one implementation, initiate call message 560 may be provided, for example, over an established TCP/IP (Transmission Control Protocol/Internet Protocol) connection. In other implementations, call queue server 140 may send initiate call message 560 via an a SMS message, a UDP push, or an intermediate entity (e.g., an EVDO session manager or an AN/BSC) which in turns sends the indication to access terminal 110 using a UATI assigned to access terminal 110.

Based on initiate call message 560, access terminal 110 may initiate a voice connection to a customer service agent within customer service network 150, as indicated by reference number 570. Voice connection 570 may include a connection between access terminal 110 and a device within customer service network 150 (e.g., agent computing device 152 and/or voice unit 154) to permit voice communications. For example, a user of access terminal 110 may place a call to a telephone number associated with a particular agent or group of agents within customer service network 150. The call may be routed (e.g., via network 160) to customer service network 150, where the call may be subsequently routed to an agent computing device 152 and/or voice unit 154 associated with a particular agent. Thus, the user of access terminal 110 may initiate two-way voice communications between access terminal 110 and the device within customer service network 150.

Using information received from, for example, queue status 560, a customer service agent within customer service network 150 may retrieve information already provided from access terminal 110 to data server 130, as indicated by reference number 580. For example, in one implementation, when call queue server 140 assigned a particular customer service agent to a particular request from access terminal 110 (e.g., in connection with providing initiate call message 560), call queue server 140 may provide queue status message 550 to inform customer service network 150 of the agent/access terminal assignment. Account data 580 may be provided from data server 130 to customer service network 150 in advance or during voice connection 570. In other implementations, a customer service agent may alter user account information, and account data 580 may be provided from customer service network 150 to data server 130 during or after voice connection 570.

Although FIG. 5 shows exemplary components of network portion 500, in other implementations, network portion 500 may contain fewer, different, differently arranged, or additional components than depicted in FIG. 5. In still other implementations, one or more components of network portion 500 may perform one or more other tasks described as being performed by one or more other components of network portion 500.

Figure 6:
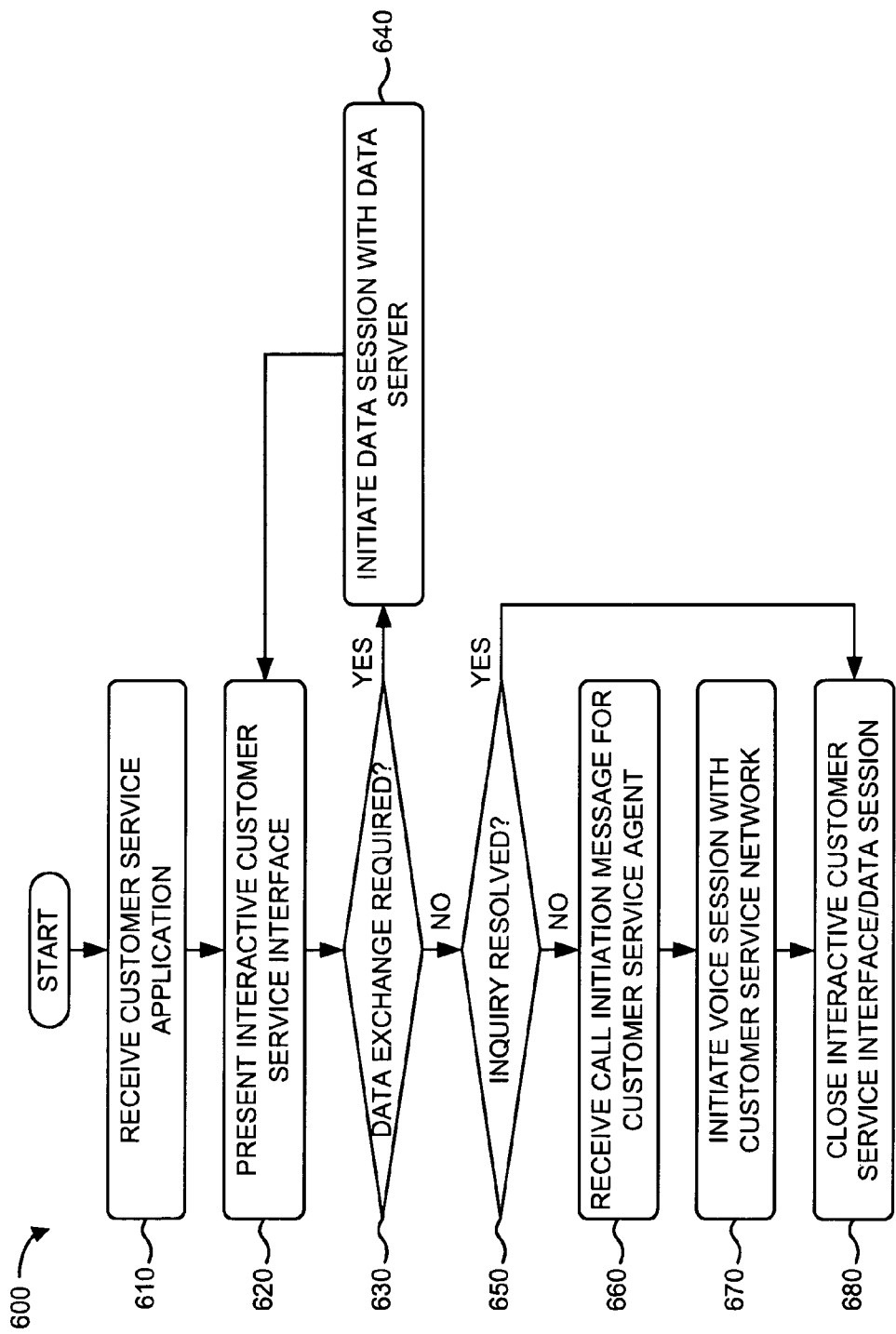
FIG. 6 depicts a flow chart of an exemplary process for accessing customer services via an access terminal according to implementations described herein.

FIG. 6 depicts a flow chart of an exemplary process 600 for accessing customer services via an access terminal according to implementations described herein. In one implementation, process 600 may be performed by access terminal 110. In other implementations, some or all of process 600 may be performed by another device or group of devices (e.g., communicating with access terminal 110), such as application server 120, data server 130, and/or call queue server 140.

As illustrated in FIG. 6, process 600 may include receiving a customer service application (block 610). For example, in implementations described above in connection with FIG. 4, access terminal 110 may provide an application and/or application updates for the interactive customer service interface, as shown by reference number 410. The application for the interactive customer service interface may include menu information, a tree/directory structure, connection information for data server 130, and other information to facilitate customer inquiries.

An interactive customer service interface may be presented (block 620). For example, a user of access terminal 110 may initiate a customer service inquiry by launching the interactive customer service interface on access terminal 110. The interactive customer service interface may provide a sequence of screens that prompt the user to identify the user's particular request and/or the type of request.

It may be determined if a data exchange is required (block 630). For example, in implementations described above in connection with FIG. 5, a user navigating through the interactive customer service interface may provide an inquiry that requires information from an external source. If a data exchange is required (block 630—YES), a data session may be initiated with a data server (block 640). For example, in implementations described above in connection with FIG. 5, access terminal 110 may initiate a data connection with data server 130 and send a data request 510/receive a data reply 520 via network 160. Information from the data exchange may be presented to the user of access terminal 110 via the interactive customer service interface. Thus, process 600 may return to block 620 to allow a user to proceed further through the interactive customer service interface.

If a data exchange is not required (block 630—NO), it may be determined if the inquiry is resolved (block 650). For example, access terminal 110 may provide a user prompt to determine if the user's inquiry has been resolved. If the inquiry is resolved (block 650—YES), the interactive customer service interface and/or the data session may be closed (block 680). For example, access terminal 110 may prompt the user to close the interactive customer service interface.

If the inquiry is not resolved (block 650—NO), a call initiation message for a customer service agent may be received (block 660) and a voice session may be initiated with a customer service network (block 670). For example, in implementations described above in connection with FIG. 5, access terminal 110 may receive initiate call message 560 from call queue server 140. The call initiate message 560 may cause access terminal 110 to automatically initiate voice connection 570 with a particular agent of customer service network 150 (e.g., a telephone number associated with customer service network 150). The call may be routed (e.g., via network 160) to customer service network 150, where the call may be subsequently routed to an agent computing device 162 and/or voice unit 164 associated with a particular customer service agent. At a point during or after voice connection 570 is initiated, the interactive customer service interface and/or the data session may be closed (block 680).

Figure 7:
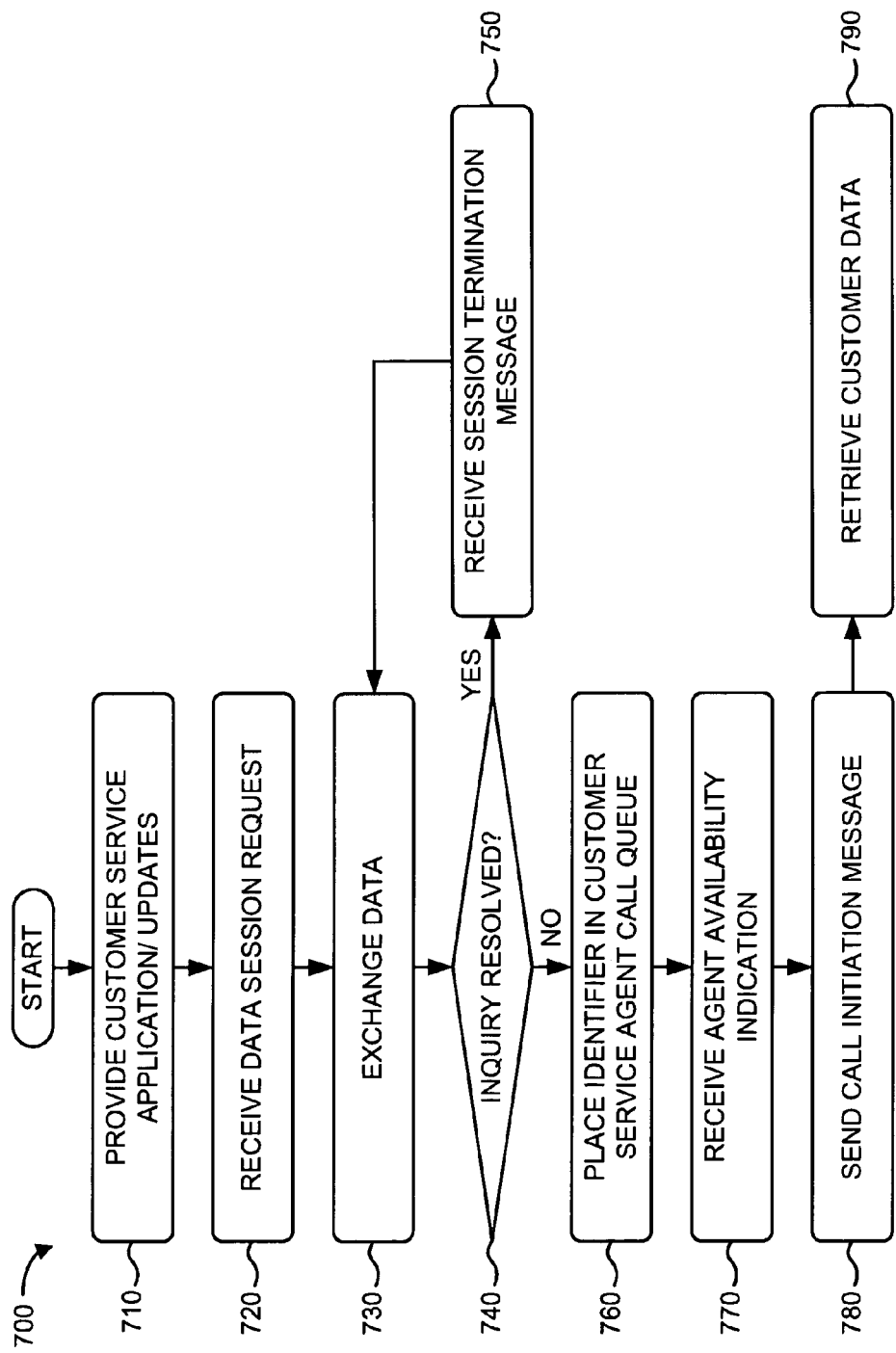
FIG. 7 depicts a flow chart of an exemplary process for providing customer services to a customer using an access terminal according to implementations described herein.

FIG. 7 depicts a flow chart of an exemplary process 700 for providing customer services to a customer using an access terminal according to implementations described herein. In one implementation, process 700 may be performed by one or more of application server 120, data server 130, and/or call queue server 140. In other implementations, some or all of process 700 may be performed by another device or group of devices (e.g., communicating with application server 120, data server 130, or call queue server 140), such as access terminal 110 and/or devices within customer service network 150.

As shown in FIG. 7, process 700 may include providing customer service applications and/or updates (block 710). For example, in implementations described above in connection with FIG. 4, application server 120 may provide to access terminal 110 an application and/or application update for an interactive customer service interface.

A data session request may be received (block 720) and a data exchange may be conducted (block 730). For example, in implementations described above in connection with FIG. 5, data server 130 may receive data request 510 from access terminal 110, may retrieve data that responds to the data request, and may send data reply 520 to the access terminal 110. In one implementation, multiple data requests 510 and data replies 520 may be exchanged to address a customer inquiry.

It may be determined if the inquiry is resolved (block 740). For example, data server 130 may receive an indication from access terminal 110 whether the customer inquiry has been resolved. If the inquiry is resolved (block 740—YES), a session termination message may be received (block 750). For example, data server 130 may receive a signal from access terminal 110 terminating the TCP/IP session with data server 130. In another implementation, the session between access terminal 110 and data server 130 may simply time out.

If the inquiry is not resolved (block 740—NO), an identifier may be placed in a customer service agent call queue (block 760), an operator availability indication may be received (block 770), and a call initiation message may be sent (block 780). For example, in implementations described above in connection with FIG. 5, data server 130 may receive a data request 510 that includes a request to speak with a customer service representative and initiate a service call request to call queue server 140, as indicated by reference number 530. Service call request 530 may include particular information sufficient to identify a particular type of customer service agent needed to address the request from the user of access terminal 110. Customer service network 150 may provide updates to call queue server 140 regarding the availability of customer service agents within customer service network 150, as indicated by reference number 540, and call queue server 140 may provide the status of one or more call queues to customer service network 150, as indicated by reference number 550. When an appropriate customer service agent is available at customer service network 150, initiate call message 560 may be provided from call queue server 140 to access terminal 110.

Customer data may be retrieved (block 790). For example, in implementations described above in connection with FIG. 5, a customer service agent (e.g., via agent computing device 152) may establish a data connection with data server 130 to access and/or provide customer information to help facilitate the customer inquiry.

Figure 8:
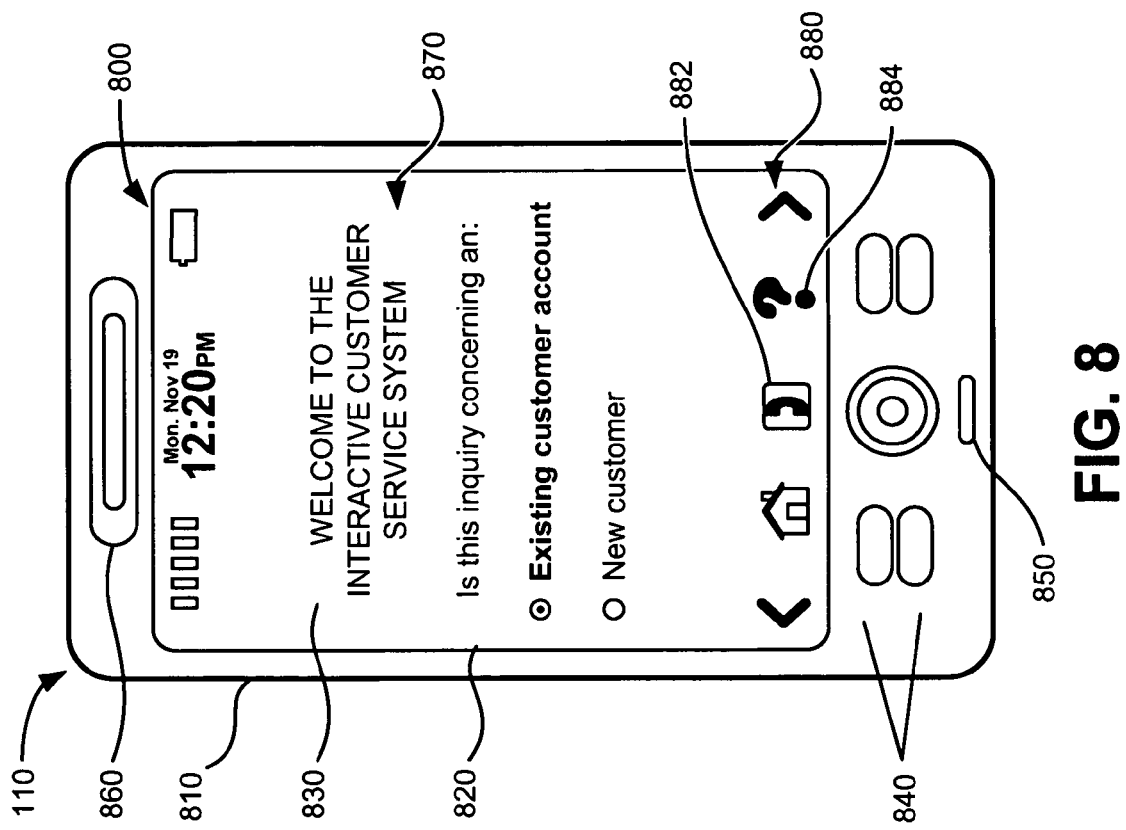
FIG. 8 provides an illustration of an exemplary implementation of an interactive customer service interface for an access terminal.

FIG. 8 provides an illustration of an exemplary implementation of an interactive customer service interface 800 on access terminal 110. As illustrated in FIG. 8, access terminal 110 may include a housing 810, a display 820, a touch panel 830, control buttons 840, a microphone 850, and/or a speaker 860. Housing 810 may secure the components of access terminal 110 and protect them from outside elements.

Display 820 may provide visual information to the user. For example, display 820 may display text, images, and/or video, generally, and particularly text, images, and/or video relating to interactive customer service interface 800. Display 820 may include, for example, a liquid crystal display (LCD), such as a thin film transistor (TFT) LCD, etc.

Touch panel 830 may be integrated with and/or overlaid on display 820 to form a touch screen or a panel-enabled display that may function as a user input interface. For example, in one implementation, touch panel 830 may include near field-sensitive (e.g., capacitive) technology, acoustically-sensitive (e.g., surface acoustic wave) technology, photo-sensitive (e.g., infra-red) technology, pressure-sensitive (e.g., resistive) technology, force-detection technology and/or any other type of touch panel overlay that allows display 820 to be used as an input device.

Control buttons 840 may permit the user to interact with access terminal 110 to cause access terminal 110 to perform one or more operations. For example, control buttons 840 may be used to cause access terminal 110 to transmit information. In one implementation, one or more control buttons 840 may be used to activate/deactivate interactive customer service interface 800.

Microphone 850 may receive audible information from the user. For example, microphone 850 may receive audio signals from the user and may output electrical signals corresponding to the received audio signals. Speaker 860 may provide audible information to a user of access terminal 110. Speaker 860 may be located in an upper portion of access terminal 110, and may function as an ear piece when a user is engaged in a voice communication session using access terminal 110.

Interactive customer service interface 800 may include an information entry/display section 870 and a navigation section 880 presented on access terminal 110. Information entry/display section 870 may include multiple menus and/or display screens to solicit responses from a user and to display responsive information to a user. In one implementation, information entry/display section 870 may lead a user through a series of screens to identify the nature of customer service desired by the user. The screens may implement, for example, controlled input options, such as text fields, select boxes, multi-select boxes, radio buttons, and checkboxes, etc.

Navigation section 880 may include a variety of command icons to allow a user to navigate through the directory tree of interactive customer service interface 800. For example, navigation section 880 may include a back, forward, and home icon to allow a user to navigate to particular screens within interactive customer service interface 800. Navigation section 880 may also include a request agent icon 882 and a directory display icon 884.

Request agent icon 882 may provide a user with the option of opting out of the multiple screens of interactive customer service interface 800 and seeking the first available communication with a customer service agent. Upon a user's selection of request agent icon 882, for example, access terminal 110 may forward a data request to data server 130 for a customer service agent. The data request may be based on the information collected via interactive customer service interface 800 up to the point that request agent icon 882 was selected. In one implementation, the data request for a customer service agent may be handled in a similar manner described in connection with, for example, service call request 530, agent availability 540, queue status 550, initiate call message 560, and voice connection 570 of FIG. 5.

Directory display icon 884 may provide a view of the user's current location within the decision tree structure of interactive customer service interface 800. For example, selection of directory display icon 884 may cause access terminal 110 to display a separate screen showing the various screen groupings, titles, section headings, etc., of interactive customer service interface 800.

Although FIG. 8 shows an exemplary interactive customer service interface 800, in other implementations, interactive customer service interface 800 may contain fewer, different, differently arranged, or additional items than depicted in FIG. 8.

Figure 9:
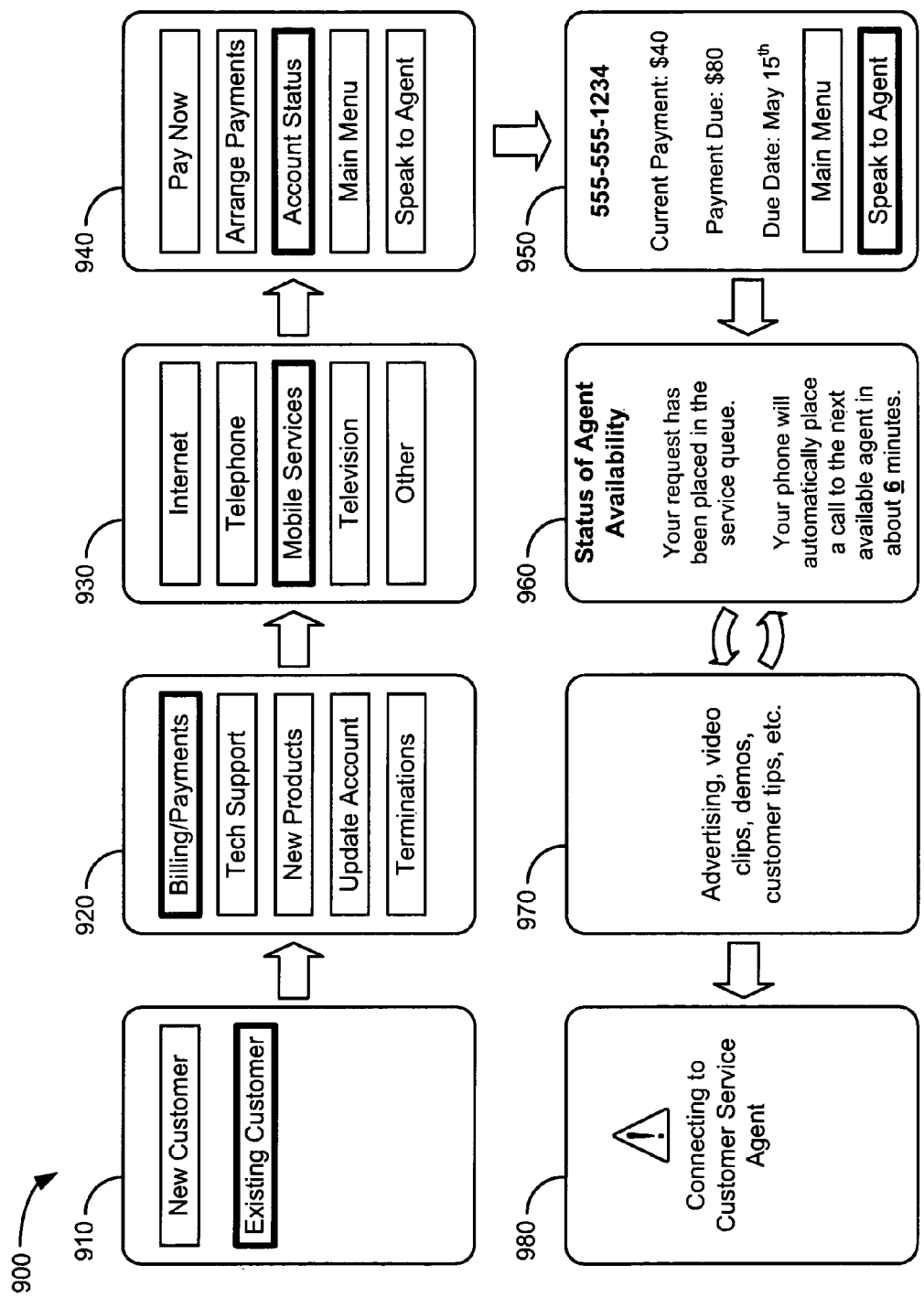
FIG. 9 provides an exemplary screen sequence for an interactive customer service interface for an access terminal.

FIG. 9 provides an exemplary screen sequence 900 for an interactive customer service interface for access terminal 110. As shown in FIG. 9, after a user has initiated the interactive customer service interface, a user may be prompted in screen 910 to select a customer status (e.g., "New Customer" or "Existing Customer"). Assuming the "Existing Customer" option is selected, a next screen 920 may prompt a user to select from a general service category (e.g., "Billing/Payments," "Tech Support," "New Products," "Update Accounts," and "Terminations"). Assuming the "Billing/Payments" option is selected, a subsequent screen 930 may prompt the user to select from a type of account (e.g., "Internet," "Telephone," Mobile Services," "Television," and "Other"). If the option "Mobile Services" is selected, another screen 940 may prompt a user to select from a group of options relating to payments for a mobile services account (e.g., "Pay Now," "Arrange Payments," and "Account Status"). Depending on the arrangement of the interactive customer service interface, options to return to a main menu and speak to an agent may be provided as part of screen 940. In other implementations, options to return to a main menu and speak to an agent may be provided as dedicated options on every screen (e.g., home icon and request agent icon 882 of FIG. 8).

In the exemplary implementation of FIG. 9, screens 910-940 may be presented by access terminal 110 without relying on external data (e.g., without establishing external communications). Assuming a user selects the "Account Status" option of screen 940, access terminal 110 may then establish data communications with a server (e.g., data server 130) to request account information in accordance with the category identified by the user. As shown in screen 950, the requested information, once received, may be displayed along with prompts for additional options (e.g., "Main Menu" and "Speak to Agent").

Assuming the user selects the option "Speak to Agent" in screen 950, access terminal 110 may submit a request to data server 130 to speak to a customer service agent responsible for existing mobile services accounts. As described, for example, in connection with FIG. 5, the request may be processed and provided to call queue server 140. In one implementation, call queue server 140 or data server 130 may provide access terminal 110 with an estimate of the wait time for an available customer service agent based on the current number of entries in particular queue (e.g., existing mobile services accounts) to which the user's request is assigned. Screen 960 may display an indication to the user that a request to speak with a customer service agent has been placed and (if applicable) the approximate wait time (e.g., "6 minutes").

During the wait time, as shown in screen 970, advertising material, video clips, demonstrations and/or tips relating to, for example, features associated with a user's inquiry may be displayed. In one implementation, the interactive customer service interface may alternate between screens 970 and 960 as the wait-time status of changes. Once a customer service agent is available, access terminal 110 may receive an indication (e.g., initiate call message 560) that a customer service agent is available. As shown in screen 980, the interactive customer service interface may provide an indication (e.g., "Connecting to Customer Service Agent") that a call is being placed and automatically initiate a voice connection with the available agent. In other implementations, the interactive customer service interface may request a confirmation from a user before automatically initiating the voice connection to the available agent.

Although FIG. 9 shows an exemplary screens sequence 900 for an interactive customer service interface, in other implementations, screen sequence 900 may contain fewer, different, differently arranged, or additional screens than depicted in FIG. 9.

Systems and/or methods described herein may provide an interactive customer service interface for an access terminal. The access terminal may receive and format a request from a user via the interactive customer service interface and initiate a data session with a data server to retrieve data responsive to the request from the user. The request may include information includes data to identify a category of the customer service request. A data server may receive the customer service request, which may include a request to speak with a customer service agent. Based in the request, a queue server may place a service call request in a calling queue associated with the category of the customer service request. The queue server may monitor the availability of customer service agents associated with the calling queue and send a call initiation message to the access terminal when a customer service agent associated with the calling queue is available. Based on the call initiation message, the access terminal may automatically initiate a voice session with an available customer service agent.

Systems and/or methods described herein may interactively prompt a user with possible solutions to a user inquiry. If the interactive prompts do not resolve the user inquiry, systems and/or methods described herein may generate a service call request that include information provided by the user and/or retrieved from the access terminal. A queue server may notify the access terminal when an appropriate customer service agent is available and automatically initiate a voice session with the available agent. Thus, no voice session is initiated until a customer service agent is available and network resources may be preserved.

The foregoing description provides illustration and description, but is not intended to be exhaustive or to limit the embodiments to the precise form disclosed. Modifications and variations are possible in light of the above teachings or may be acquired from practice of systems and methods disclosed herein.

For example, while particular implementations have been provided with respect to access terminal 110 being mobile device, a wide variety of other devices, such as gaming devices, printing devices, portable media players, etc. may be used as an access terminal 110. Further, while particular implementations relating to communications services have been described, other customer support services may be used according to implementations herein. Also, while series of blocks have been described with regard to FIGS. 6 and 7, the order of the blocks may differ in other implementations. Further, non-dependent blocks may be performed in parallel.

It will be apparent that exemplary aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
   receiving, by an access terminal, a request from a user via an interactive customer service interface;
   initiating, by the access terminal and after receiving the request, a data session with a data server for the data server to inform a call queue server about the request from the user;
   receiving, by the access terminal and from the call queue server, a call initiation message that includes instructions for the access terminal to initiate a voice call to a particular available customer service agent; and initiating, by the access terminal, the voice call to the particular available customer service agent based on the call initiation message.

2. The method of claim 1, further comprising:
receiving, by the access terminal and from the data server, data, and
presenting, based on the data, an indication that the data server does not have or cannot obtain information that is sufficient to respond to the request.

3. The method of claim 1, where the call initiation message includes contact information for the particular available customer service agent.

4. The method of claim 1,
where the particular available customer service agent is associated with a customer service network that is associated with groups of customer service agents that provide multiple categories of customer service, and
where a particular group, of the groups of customer service agents, includes the particular available customer service agent.

5. The method of claim 1, further comprising:
providing, by the access terminal and to the data server, stored information relating to the access terminal.

6. The method of claim 5, where the stored information relating to the access terminal includes one or more of:
a device model,
a device class,
a mobile directory number (MDN),
a unicast access terminal identifier (UATI),
an Internet protocol (IP) address, or
a User Datagram Protocol (UDP) port.

7. The method of claim 1, where the data session is established via a Transmission Control Protocol/Internet Protocol (TCP/IP) connection.

8. A method comprising:
receiving, by one or more server devices and from an access terminal, information relating to a customer service request,
the information identifying a category associated with the customer service request;
receiving, by the one or more server devices and from the access terminal, a request to speak regarding the customer service request;
placing, by the one or more server devices, a service call request in a calling queue associated with the category;
determining, by the one or more server devices, that a customer service agent associated with the calling queue is available; and
sending, by the one or more server devices, a call initiation message to the access terminal after determining that the customer service agent associated with the calling queue is available,
the call initiation message including instructions for the access terminal to initiate a voice call to the customer service agent.

9. The method of claim 8, further comprising:
providing, to the access terminal and before receiving the request to speak, data based on the customer service request.

10. The method of claim 8, where the call initiation message includes contact information for the customer service agent associated with the calling queue.

11. The method of claim 9,
where the information relating to the customer service request further includes stored information relating to the access terminal, and
where the method further comprises:
sending, by the one or more server devices and to the customer service agent associated with the calling queue, the stored information relating to the access terminal.

12. A mobile access terminal comprising:
a processor to:
present, on a display, an interactive customer service interface that generates a customer service request based on user input,
initiate a data session with a data server of a customer service provider,
provide a customer service request to the data server,
the customer service request including stored information relating to the access terminal,
receive a call initiation message from a call queue server,
the call initiation message including instructions for the mobile access terminal to initiate a voice session with an available customer service agent, and
initiate, over a wireless carrier network, the voice session with the available customer service agent based on the instructions.

13. The mobile access terminal of claim 12, further comprising:
a touch panel to receive the user input via the interactive customer service interface.

14. The mobile access terminal of claim 12, where the processor is further to:
receive, from the data server, data based on the customer service request, and
present the data on the display.

15. The mobile access terminal of claim 12, where the mobile access terminal comprises one or more of:
a radiotelephone,
a personal communications system (PCS) terminal,
a personal digital assistant (PDA), or
a laptop computer.

16. A system comprising:
one or more server devices to:
receive, from an access terminal, a request to speak with a customer service agent,
the request identifying a particular category of customer services;
place information associated with the access terminal in a calling queue associated with the particular category;
one or more server devices to monitor an availability of customer service agents associated with the calling queue,
the customer service agents including the customer service agent; and
send, based on the monitoring of the availability of the customer service agents, a call initiation message to the access terminal when the customer service agent,
the call initiation message including instructions for the access terminal to initiate a voice call to the customer service agent.

17. The system of claim 16,
where the one or more server devices are further to:
receive, from the access terminal, stored information relating to the access terminal; and
provide, to a computing device associated with the customer service agent, the stored information relating to the access terminal.

18. The system of claim 16,
where the one or more server devices are further to:

receive, from the access terminal and before receiving the request to speak, a request for information associated with the particular category of customer services; and provide, to the access terminal, data responsive to the request for information.

19. A non-transitory computer-readable medium storing instructions, the instructions comprising:

one or more instructions that, when executed by at least one processor, cause the at least one processor to:

receive information relating to a customer service request, the information identifying a category associated with the customer service request;

place a call request, based on the customer service request, in a calling queue associated with the category;

determine, after placing the call request in the calling queue, that a customer service agent associated with the calling queue is available; and send, to an access terminal associated with the customer service request, instructions for the access terminal to initiate a voice call to the customer service agent.

20. The non-transitory computer-readable medium of claim 19, where the instructions further comprise:

one or more instructions to:

provide a telephone number of the customer service agent to the access terminal.

21. The system of claim 16, where the one or more server devices are further to:

receive an inquiry from the access terminal, determine that the one or more server devices do not have or cannot obtain information that is sufficient to respond to the inquiry, and provide, to the access terminal, a response that indicates that the one or more server devices do not have or cannot obtain the information that is sufficient to respond to the inquiry and a suggestion to provide the request to speak with the customer service agent regarding the inquiry.

22. The non-transitory computer-readable medium of claim 19, where the instructions further comprise:

one or more instructions to:

determine an estimated wait time base on a current quantity of service call requests in the calling queue associated with the category, and provide, to the access terminal, information identifying the estimated wait time.

* * * * *